Feb. 24, 1948.  C. C. BOZENHARD ET AL  2,436,709
TIRE CHAIN
Filed May 21, 1947
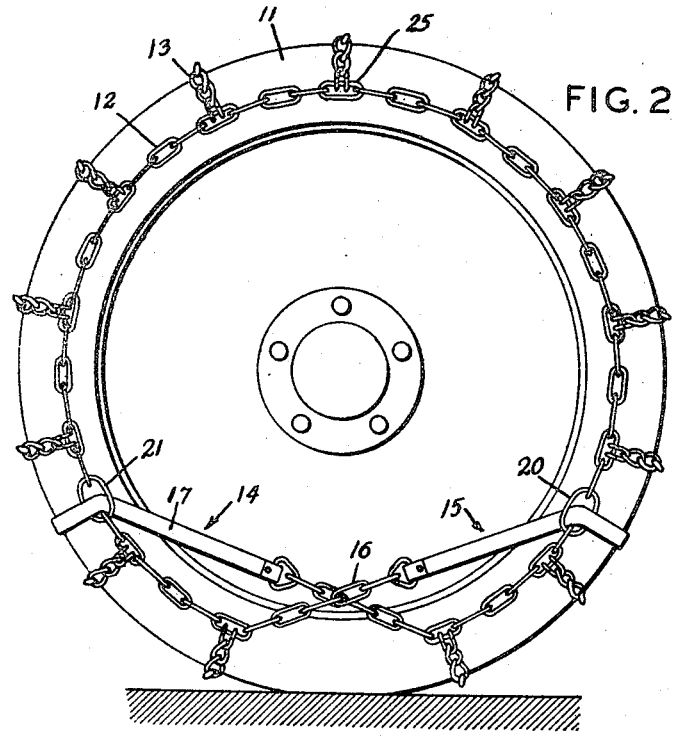
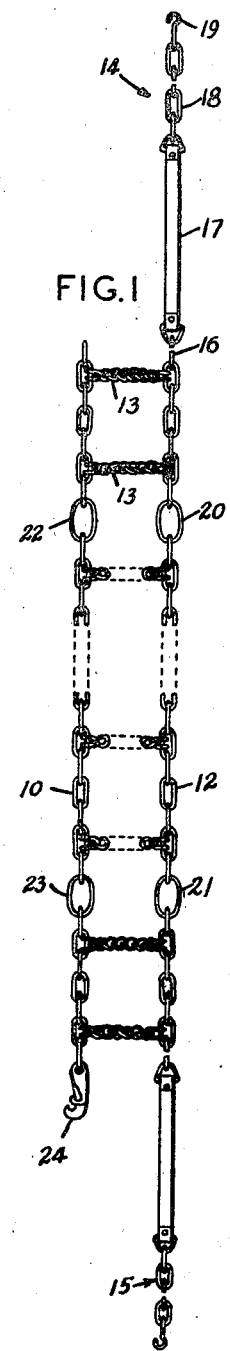
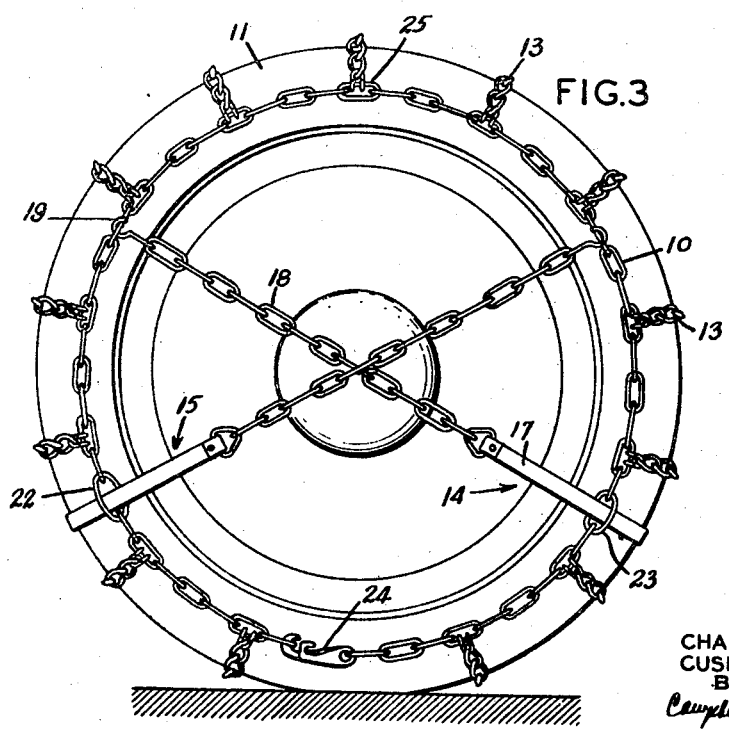
INVENTOR
CHARLES C. BOZENHARD
CUSHING C. BOZENHARD
BY
Campbell Brumbaugh + Free
ATTORNEY Patented Feb. 24, 1948

2,436,709

UNITED STATES PATENT OFFICE 2,436,709

TIRE CHAIN

Charles C. Bozenhard and Cushing C. Bozenhard, Yonkers, N. Y.

Application May 21, 1947, Serial No. 749,494

5 Claims. (Cl. 152—241)

This invention relates to anti-skid devices, and it relates particularly to tire chains for pneumatic tire vehicles for preventing skidding and for improving the traction of such vehicles.

The tire chains now available include inner and outer side chain members and cross chains or links which extend across the tread of the tire and are connected at their ends to the side chains. The ends of the side chains are provided with catches or couplings for securing the ends of the side chains together.

It has always been necessary either to jack up the vehicle or move the vehicle to apply the ordinary chains to the tires of the vehicle. Even then it is difficult to avoid soiling the clothing for the inner chain is not accessible and it is necessary to reach in behind the wheel to connect the ends of the inner chain.

Numerous suggestions have been made in the past for improving tire chains to facilitate their application to the vehicle tire. Most of such suggestions have not been practical for the modified tire chains are too complicated or they really do not solve the problem at all.

An object of the present invention is to provide a simple form of tire chain which can be applied readily to a tire or wheel of a vehicle without the necessity of moving or jacking up the vehicle.

Another object of the invention is to provide a tire chain which can be placed on a vehicle tire and secured thereon with the coupling elements in an accessible location.

Other objects of the invention will become apparent from the following description of a typical form of tire chain embodying the present invention.

In accordance with this invention, we have provided a tire chain which is provided with one side chain element of substantially conventional type which is adapted to be disposed adjacent the outer side wall of the tire, suitable cross chains adapted to extend over the tread of the tire and another side chain of novel construction which permits the entire chain to be secured to the tire from the outside rather than the inside of the wheel.

More particularly, the side chain member which is disposed adjacent the inner side wall of the tire is provided with extensions at its opposite ends which are adapted to be crossed and passed through links adjacent the inner ends of the extensions to draw the ends of the inner side chain member together. The extensions are passed across the tread of the tire and through links in the outer chain element and across the wheel, where they are secured to the opposite side of the outer side chain member in order to hold the inner side chain in proper relation to the tire.

The spacing of the retaining links for the extensions is such that they are a substantial distance on opposite sides of the portion of the tire which is in contact with the ground but below the fender and running board of the vehicle so that access is had very easily to these links to thread the extensions through them. Also, the extensions can be passed around the tread of the tire without obstruction by the surface on which the tire is resting. Preferably, the extensions are in the form of chain elements having sections of rubber strap or other wear-resisting material therein at the zones where the extensions pass over or cross the tread of the tire. Of course, suitable cross chain or cable portions may be provided in the extensions and spring elements provided for imparting the proper tension to the inner chain of the tire.

The center link of the outside side chain member may be colored differently or formed of a different colored metal in order to indicate the center of the chain. This link is placed at the top of the tire to position the extensions so that they can be connected without interference from the body of the vehicle, or the supporting surface on which the tire rests.

The greatest advantage of these chains is that they make it unnecessary to reach up under the fenders of the vehicle in order to connect the ends of the side chain elements. The chains can be tightened sufficiently to hold them in position while working from the outside of the wheel, thereby permitting the side chains to be applied even when the vehicle is in mud or snow. As the vehicle operates, the inner chain adjusts itself to the tire due to the tension of the resilient portions in the extensions.

For a better understanding of the present invention, reference may be had to the accompanying drawing in which:

Figure 1 is a view of a typical form of tire chain embodying the present invention shown in its extended or laid out position;

Figure 2 is a view looking toward the inside of a pneumatic tire vehicle wheel showing the chain applied thereto; and Figure 3 is a view in elevation looking toward the outside of the pneumatic tire vehicle wheel showing the chain applied thereto.

Referring now to Figure 1 of the drawing, a typical form of tire chain in accordance with the present invention may include a substantially conventional side chain element 10 which is adapted to be disposed at or adjacent the outer side wall of a vehicle tire 11, as viewed in Figure 3. The tire chain also includes another side chain element 12 which is connected to the side chain element 10 by means of a plurality of cross chain members 13 of any conventional type which are adapted to extend across the tread of the tire 11.

The chain member 12 which is disposed adjacent the inner side wall of the tire 11 is provided with extensions 14 and 15 at its opposite ends. The extension 14 may include a short chain portion 16, which is coupled at its outer end to a heavy strap 17 formed preferably of vulcanized rubber which has its outer end connected in turn to another metallic chain element 18 provided with a hook 19 on its outer end. The extension 15 is the same as the extension 14. Adjacent the inner ends of the extensions 14 and 15, and preferably near the ends of the side chain 12, are enlarged links 20 and 21 for a purpose to be described.

The side chain 10 is provided with similar enlarged links 22 and 23 which are located in angularly spaced relation to the links 20 and 21 when the anti-skid chain is secured to the tire. The end of the chain 10 is provided with the usual coupling or catch 24.

When it is desired to apply the chain to the tire 11, the center portion of the chain is placed over the top of the tire 11, as shown in Figures 2 and 3. The center of the chain may be indicated by a colored link 25 in about the middle of the chain 10. This link may be formed of brass or may be plated or coated with a different metal or other material to make it contrast with the color or appearance of the remainder of the chain.

The inner chain 12 is merely dropped over and behind the tire 11. The extension 14 may then be thrown in behind the tire in a position where it can be gripped and it is then threaded through the enlarged link 21, which can, if desired, be pulled around in front of the tire to facilitate insertion of the extension 14 through the link 21. The loose end of the extension 14 is then pulled around the tread of the tire and through the link 23. The opposite extension 15 is likewise thrown across the back of the tire, passed through the link 20, around the tread of the tire, and through the link 22. The ends of the outer chain 10 are hooked together by means of the coupling 24 and the extensions 14 and 15 are drawn up tightly so that the entire anti-skid chain is in snugly fitted relation to the tire 11. The hooks 19 are then hooked into the chain 10 at points about diametrically opposite the links 22 and 23. Preferably, the links 20 and 22 are angularly spaced from about 45° to 90° from the links 21 and 23 when the chain is assembled on the tire in order to clear the supporting surface and the fenders of the vehicle. The rubbery straps 17 in the extensions 14 and 15 create a tension tending to pull the inner chain snugly against the side wall of the tire and thereby retain the entire anti-skid chain in assembled relationship on the tire.

It will be understood that the size of the tire chains and the design of their links can be modified substantially. Also, the rubber straps in the extensions can be omitted and springs used near the outer ends of the extensions to provide the desired tension on the inner chain. Moreover, cables or other similar flexible members may be used instead of chains in the extensions or for the side chain elements. Therefore, the form of the invention described above should be considered as illustrative and not as limiting the scope of the following claims.

We claim:

1. An anti-skid chain for a vehicle tire comprising an inner side chain element, an outer side chain element, fastening means on the ends of said outer side chain element for detachably connecting the ends of said outer side chain element, cross chains connecting said side chain elements, enlarged links adjacent each end of each side chain element, an extension on each end of said inner side chain element of sufficient length to extend through the link at the opposite end of said inner side chain element when applied to a tire, over the tread of said tire, and through said link at the corresponding end of said outer tire chain element, and means for detachably connecting the outer end of each extension to said outer tire chain element.

2. An anti-skid chain for a vehicle tire comprising an inner side chain element, an outer side chain element, fastening means on the ends of said outer side chain element for detachably connecting the ends of said outer side chain element, cross chains connecting said side chain elements, enlarged links adjacent each end of each side chain element, an extension, including a resilient member, on each end of said inner side chain element, of sufficient length to extend through the link at the opposite end of said inner side chain element when applied to a tire, over the tread of said tire, and through said link at the corresponding end of said outer tire chain element, and means for detachably connecting the outer end of each extension to said outer tire chain element.

3. An anti-skid chain for a vehicle tire comprising an inner side chain element, an outer side chain element, fastening means on the ends of said outer side chain element for detachably connecting the ends of said outer side chain element, cross chains connecting said side chain elements, enlarged links adjacent each end of each side chain element, an extension on each end of said inner side chain element of sufficient length to extend through the link at the opposite end of said inner side chain element, when applied to a tire, and through said link at the corresponding end of said outer tire chain element, each of said extensions including a resilient strap at about its mid-portion adapted to extend over said tread of said tire, and means for detachably connecting the outer end of each extension to said outer tire chain element.

4. An anti-skid chain for a vehicle tire comprising an inner side chain element and an outer side chain element adapted to be disposed adjacent to the inner side wall and outer side wall of said tire, respectively, a plurality of cross chain elements connecting said side chain elements and adapted to extend across the tread portion of said tire, elongated extensions at opposite ends of the inner side chain element, links adjacent to the ends of each side chain element of sufficiently large size to receive said extensions, each extension being sufficiently long to be passed through said link adjacent to the opposite end of the inner side chain element, then across the tread of said tire, and through a link on said outer side chain element, and means on the end of each extension for connecting it to a portion of said outer side chain substantially diametrically opposite to the link through which said extension passes.

5. An anti-skid chain for a vehicle tire comprising an inner side chain element, an outer side chain element, a distinctive link at about the middle of said outer side chain element, fastening means on the ends of said outer side chain element for detachably connecting the ends of said outer side chain element, cross chains connecting said side chain elements, enlarged links adjacent each end of each side chain element, an extension on each end of said inner side chain element of sufficient length to extend through the link at the opposite end of said inner side chain element, when applied to a tire, over the tread of said tire, and through said link at the corresponding end of said outer tire chain element, and means for detachably connecting the outer end of each extension to said outer tire chain element.

CHARLES C. BOZENHARD.
CUSHING C. BOZENHARD.